United States Patent [19]

Whyte

[11] 3,911,415

[45] Oct. 7, 1975

[54] DISTRIBUTION NETWORK POWER LINE CARRIER COMMUNICATION SYSTEM

[75] Inventor: Ian A. Whyte, Pittsburgh, Pa.

[73] Assignee: Westinghouse Electric Corporation, Pittsburgh, Pa.

[22] Filed: Oct. 31, 1974

[21] Appl. No.: 519,702

Related U.S. Application Data

[63] Continuation of Ser. No. 425,759, Dec. 18, 1973.

[52] U.S. Cl. .............................. 340/310 A; 340/150

[51] Int. Cl.$^2$ ........................................ H04M 11/04

[58] Field of Search ................................ 340/310 A

[56] References Cited

UNITED STATES PATENTS 2,327,251 8/1943 Derr .............................. 340/310 A

*Primary Examiner*—Thomas B. Habecker
*Attorney, Agent, or Firm*—D. R. Lackey

[57] ABSTRACT

A power line carrier communication system for linking individual power customers with a central station includes the power distribution network between a distribution substation and the customer locations. Frequency translating and signal reconditioning repeaters are connected to intermediate locations of the network to relay carrier signals at different frequencies. Customers are also linked to individual repeaters so as to be grouped into separate communication zones. Each repeater includes separate repeater channels for duplex operation in which two receiving and two transmitting carrier signals have separate and non-interfering frequencies. The repeaters maintain the carrier signals at usable signal to noise ratios when transmitted through extended power line distances having various attenuation and loading characteristics.

17 Claims, 6 Drawing Figures

DISTRIBUTION NETWORK POWER LINE CARRIER COMMUNICATION SYSTEM

CROSS REFERENCE TO RELATED APPLICATION

This is a continuation of application Ser. No. 425,759 filed Dec. 18, 1973, which is assigned to the same assignee as the present application.

BACKGROUND OF THE INVENTION

1. Field of the Invention

This invention relates to power line carrier communication systems and more particularly to a communication system for transmitting carrier signals over distribution network power lines by frequency translating and signal reconditioning the carrier signals at repeaters connected to the power line conductors between a substation interrogation terminal and remote customer response terminals.

2. Description of the Prior Art

The use of power line conductors for transmitting information by high frequency carrier signals is well known. The most common power line carrier applications have been for communication links over high voltage transmission lines extending between an originating electrical power site and power transmission switching sites or distribution substation sites for supervisory control applications. The high voltage transmission conductors typically extend for many miles with no intermediate transformer or load connections. The high frequency carrier signal transmission characteristics of such transmission power lines are relatively constant and attenuation of the high frequency carrier signals is not substantial in many power transmission systems.

It is substantially less common to attempt to communicate over the power line conductors of a distribution network transmitting power at intermediate voltage levels through pole mounted distribution transformers connected to separate household customers of electrical utility companies. Some of the chief difficulties in utilizing power line carrier communication techniques in distribution networks are their inherent design for 50 or 60 hertz power transmission; the large variations in electrical loads connected to the distribution power lines; their poor high frequency impedance characteristics; and the susceptibility to high frequency electrical noise and signal interference. Another known obstruction to high frequency carrier signals on a distribution power line is the large numbers of distribution transformers connected between each customer location and the substation. Until recently it has not been especially desirable to utilize the distribution network power lines for communication since high quality communication transmission lines, such as provided by telephone utilities, are substantially universally available where electrical power is also connected.

Recently, the desirability of providing remote meter readings of the power consumption meters at customer locations has increases as has the requirements for centrallized control of the customer load demand to avoid exceeding peak power demand capacities. Advancement in telemetry and computer data handling equipment as well as advancements in solid state logic circuits for meter encoding systems have increased the feasibility of remote meter reading, customer load control and monitoring from central stations. Arrangements for translating the watthour meter readings into encoded electrical signals, typically of a binary logic type are known and one such solid state system is disclosed and claimed in co-pending application Ser. No. 291,469, now U.S. Pat. No. 3,820,073, for a Solid State Remote Meter Reading System Having Nonvolatile Data Accumulation, filed Sept. 22, 1972 and assigned to the assignee of this invention. Other examples of meter reading encoding systems are described in U.S. Pat. Nos. 3,691,547 and 3,659,287, both of which are assigned to the assignee of this invention. Data handling systems for processing meter reading and billing data are disclosed in U.S. Pat. Nos. 3,678,484, issued July 18, 1972 and 3,740,724 issued June 19, 1973, both assigned to the assignee of this invention.

Conventional communication links including telephone transmission lines or wireless communication links for remote meter reading and load control systems have proven uneconomical and impractical for the required extensive and widespread use of such systems.

To afford economy and flexibility as well as adequate control and supervision of communication links between a utility company control station and power customers by the utility companies, it has been found desirable to utilize the existing power line conductors of a power distribution network already interconnecting the utility customer locations with central locations or transmission sites.

In U.S. Pat. No. 3,702,460, a power utility communication system is disclosed in which the neutral conductor and system ground of the power transmission network are used as a communication link between a group processor and terminal processors located at power customer locations for transmitting meter reading and control information. Pulse modulated radio frequency carrier signals are transmitted over the communication link provided by isolating the neutral and system ground between the processor units. The group processors are coupled to the secondary conductors of the distribution transformers serving the customer locations and are further connected to a conventional communication link connected in turn to a central station. Accordingly, a group processor is limited in providing a relaying terminal only for those customer locations it is in direct communications contact with through the isolated neutral wire and ground communications link. In many instances, extensive ground points in distribution networks make this system impractical. In U.S. Pat. No. 3,656,112, another power line communication system is disclosed as a partial communications link between an interrogation station at a power station or substation and a relay station located at a customer location to transmit customer meter reading information. Binary coded interrogation and reply transmissions include frequency shift key pulse frequency modulation signals. A wireless communication link is included in the system to relay the transmission signals around power line communications obstructions such as power transformers connected in the power line conductors. These two patents show limited uses of a power line distribution network due to the known obstructions and difficulties, such as the distribution transformers, to transmission of carrier signals.

Accordingly, it is desirable to provide monitoring, control and/or remote meter reading communication links between power customers and central locations utilizing the full extent of existing distribution network power lines connected to the individual power customers of an electrical power system.

SUMMARY OF THE INVENTION

In accordance with the present invention a distribution network power line carrier communication system includes a substation terminal having an interrogation transmitter and response receiver operating at different frequencies; remote customer terminals having response transmitters and interrogating receivers operating at different carrier frequencies; and frequency translating and signal reconditioning repeaters located at spaced locations along the network. The repeaters amplify interrogation and response carrier signals transmitted on the power lines and shift the carrier signal frequencies between inputs and outputs of two repeater channels. The repeaters are located so that the interrogation signals of one repeater reach a group or remote customer locations within a given communication zone. All of the remote terminal receivers in one zone are tuned to the same carrier signal frequencies. The customer remote terminal transmitters have sufficient amplification of the same carrier signal frequencies to reach a response receiver of the zone repeater. Adjacent repeaters are spaced so that the interrogation and response transmitters of the repeaters are of sufficient strength and quality to be received by the interrogation and response receivers of the adjacent repeaters.

Each repeater receiver circuit includes a frequency selective input circuit with noise reduction circuits connecting the input to a demodulation circuit. The demodulated receiver signal is applied to a signal processing circuit to recondition and reconstitute the original base band binary logic information signal originated at the interrogation and response transmitters at the substation and remote terminals. The reconditioned receiver signal preserves the original binary logic information signal as it is transmitted along the distribution network. Each repeater transmitter circuit input is connected to the receiver signal processor output so that the base band logic signal modulates a transmitter frequency that is different from the associated receiver carrier frequency. The modulated transmitter carrier signal is then amplified to a high output level for retransmission to adjacent repeaters and the remote customer terminals and/or the substation terminal. The four different carrier signal frequencies of each repeater are coupled to the same point on the power line conductor without mutual interference.

A frequency shift key (FSK) modulated power line carrier is used in one embodiment. The repeater receivers are coupled through a high pass coupler to one or more of the power line conductors. A received interrogation or response carrier signal is applied to a receiver band pass filter and amplifier input which is then applied to a noise limiter circuit. The FSK modulated carrier signal is then demodulated in a slope detector circuit and the detector output is applied to a signal processor including a binary logic switching circuit to recondition and reconstitute the binary logic information signal. Each of the repeater transmitters are also connected to the common coupler. The inputs to the transmitters include a FSK modulator for developing a modulated carrier signal having different frequencies than that of the receiver of the associated channel. The modulated signal is applied to a band pass filter and is then amplified by a gain factor of 10 to 1000 or more relative to the receiver input signal.

It is an important feature of this invention to provide a distribution power line carrier communication system with substantially identical receiver and transmitter circuits in each of two repeater channels of a frequency translating and signal reconditioning repeater and at a distribution substation terminal, and further at the remote customer terminals so as to simplify and substantially reduce costs of the system. It is a further feature of this invention to provide communication between a power system central station and a relatively few distribution substations by conventional communication facilities, and by using relay carrier signals through the distribution networks of the power system to establish data communication through the distribution power line conductors between the substations, and the individual power customers. It is a further feature of this invention to have frequency translating and signal reconditioning repeaters to interconnect a substation communication terminal and remote customer terminals through power lines such that the repeaters receive and transmit carrier frequencies in each of an interrogation channel and a response channel at different input and output carrier signal frequencies. This arrangement provides transmission of the carrier signals at usable signal to noise ratios as they pass through various communication obstacles of the power lines including distribution transformers.

A still further feature of this invention is to provide within an area including a group of customer locations, a communication zone in which all of the remote terminals and an associated repeater are frequency isolated so as to operate at common interrogation and response carrier signal frequencies. The communication zoning enables the encoded addresses of the remote customer terminals served by a central power system station to be reduced to the number of such customers divided by the number of substations included in the power system. A further feature of this invention is to provide an alternative repeater feature in which the two receivers of two repeater channels are connected by a switching arrangement to either of two transmitters to transmit carrier signals from the substation terminals of two or more distribution substations interconnected to a distribution network so as to operate at different carrier signal frequencies such that the different substations can be commonly linked to a given power customer location. And a further feature of this invention is to provide a frequency translating and signal reconditioning repeater for operating in a duplex mode to recondition baseband binary logic information signals of frequency shift key modulated carrier signals which are subjected to variations in loading, attenuation and wide variations in transmission characteristics typically found in distribution network power line conductors.

These and other advantages and features of the present invention will be apparent from a detailed description of the drawings.

DESCRIPTION OF THE PREFERRED EMBODIMENT

Figure 1:
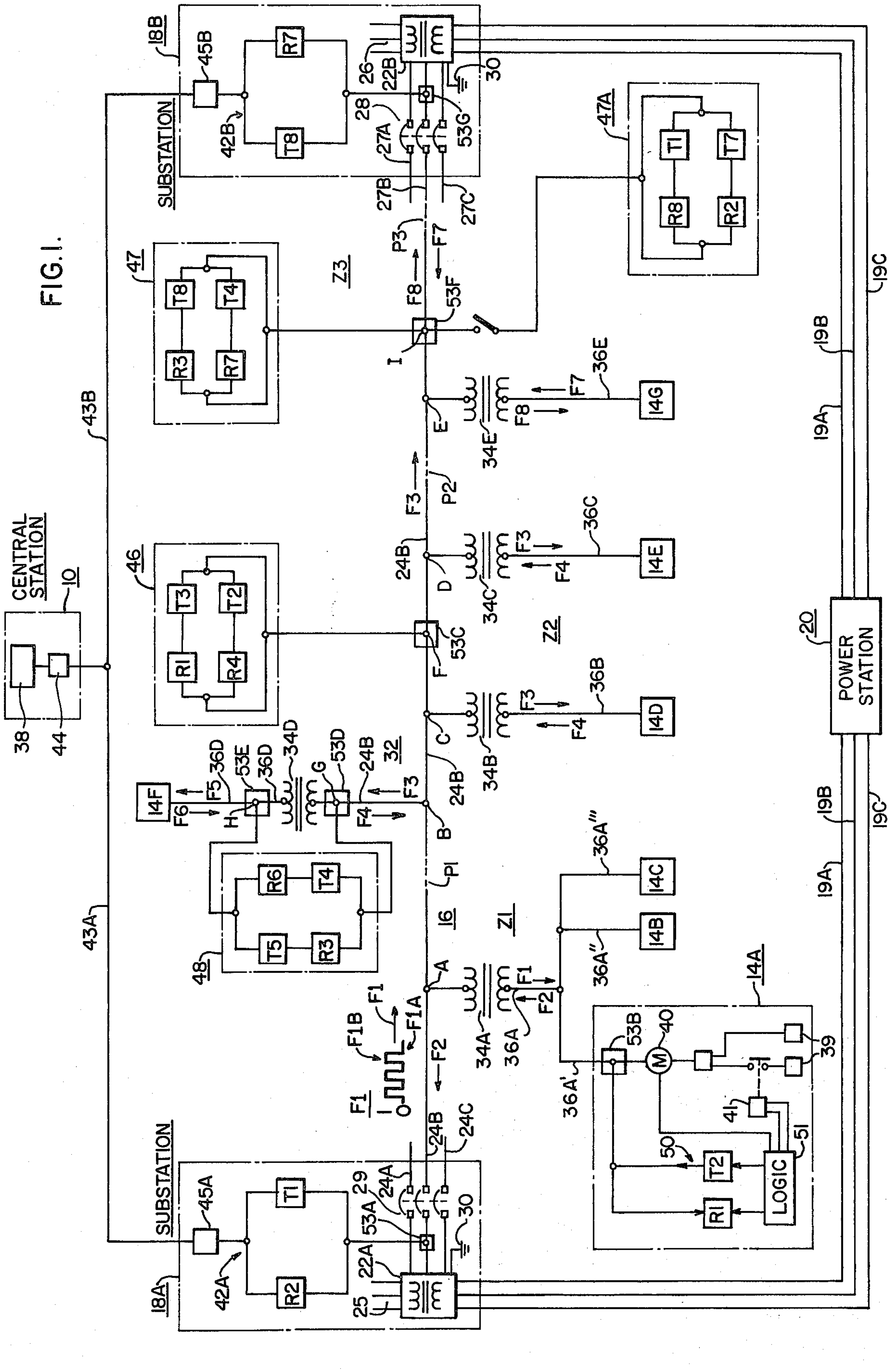
FIG. 1 is a block schematic diagram of a system for communicating between a central station and individual remote electrical power customers of a power system including a distribution network power line carrier communication system made in accordance with this invention.

Referring now to the drawings and more particularly to FIG. 1 there is a block schematic diagram of an electrical power transmission and distribution system of an electrical utility company and a system for communicating between a central station 10 of the company and individual remotely located power customers which are designated 14A, 14B, 14C, 14D, 14E, 14F and 14G. The power customer locations are connected to a distribution network 16 including distribution substations 18A and 18B, representing many such substations of the power transmission and distribution system. Typically, the substations such as 18A and 18B are connected to high voltage transmission lines 19A, 19B and 19C for conducting electrical power from a power source 20 which is an electrical power originating site and may be at a common site where the central station 10 is also located but not necessarily. The transmission lines 19A, 19B and 19C conventionally have voltages to values of several thousand volts.

The substations 18A and 18B have step-down transformer banks 22A and 22B which develop the distribution level voltages for the network 16. The transformer banks 22A and 22B can supply one or more distribution networks such as 16. The power line conductors 24A, 24B and 24C supply a primary power line portion of the distribution network 16. The group of power line conductors 25 shown extending from the transformer bank 22A are connectable to another distribution network similar to the network 16. Similarly, the transformer bank 22B of the substation 18B is connected to the lines 19A, 19B and 19C and feeds the group of distribution line conductors 26 and also the conductors 27A, 27B and 27C which can be connected by means of a line switch 28 to the distribution network 16. A line switch 29 shown at the substation 18A permits the distribution network 16 to be alternately fed by either of the substations 18A or 18B by the appropriate open and closed positions of the switches 28 and 29. In some instances the distribution network 16 can be fed by plural substations such as occurs when both of the switches 28 and 29 are closed. The distribution power lines 24A, 24B and 24C can include a grounded neutral conductor which is electrically common to the system ground of the network 16. Grounded sources are indicated at the different locations by the same numeral 30 and these sources represent a grounded neutral conductor for purposes of this description. The distribution power line conductor 24B represents any two of the power line conductors connected throughout the network to supply the primary side of distribution transformers and form part of the distribution network power line carrier communication system, generally designated 32, made in accordance with this invention as described in particular detail hereinbelow. It is to be understood that the power line conductors 24A, 24B and 24C would have voltages in an intermediate range of, for example approximately in the range of 3000 to 23,000 volts or other typically used distribution network primary line voltages. The distribution network 16 includes distribution type transformers 34A, 34B, 34C, 34D and 34E having primary connections connected to conductors 24A, 24B and 24C with only the conductor 24B being shown connected. These transformers are representative of large numbers of such distribution transformers serving very large numbers of customer locations. These transformers are connected at junctions A, B, C, D and E to the conductor 24B. As is known, the secondary out voltages of distribution transformers are in the order of 110 and 220 volts. The transformer secondary connected conductors 36A, 36B, 36C, 36D and 36E represent, as does the primary conductor 24B, any two of the secondary conductors supplying the customers and forming a connecting part of the communication system 32. The distribution transformers such as transformer 34A may serve a plurality of customers such as the three customers 14A, 14B and 14C connected to the secondary of the transformer 34A by conductors 36A', 36A'' and 36A''' connected to the same secondary connected conductor 36A. The transformer 34A is connected at junction A of the conductor 24B to supply the customers 14A, 14B and 14C which are at close distances from the substation 18A. The schematic block of customer 14A includes a detail schematic block diagram which is to be taken as typical of the other customer locations.

Before describing the distribution network power line carrier communication system 32 in detail, it is to be noted that the system shown in FIG. 1 is utilized, in the illustrated preferred embodiment, to complete a communication line extending between the central station 10 and the individual customers designated 14A through 14G. The central station 10 includes a central communication terminal 38 for processing desired monitoring, control and, more particularly, meter reading data information of each of the customers of the power system under control, for example, of a computer. Data functions may include, for example, monitoring the condition of the customer loads shown by numeral 39 in block 14A, and remotely reading the indications of a watthour meter 40, and controlling a load control apparatus 41 for regulating, for example, electric power supplied to water heaters of residential customer loads so as to regulate the maximum peak power demands of the power system.

The central terminal 38 of the central station 10 is contemplated to be connected to substation communication terminals indicatd by numerals 42A and 42B in substations 18A and 18B by conventional communication connections such as leased telephone data lines 43A and 43B. These lines are terminated by a data set 44 at the central terminal 38. Matching data sets 45A and 45B terminate the lines 43A and 43B at the substation terminals 42A and 42B, respectively. The data sets 44, 45A and 45B are a conventional type often furnished by telephone companies and have inputs and outputs at the terminal sides furnishing and receiving binary coded information signals. It is contemplated that other conventional communication connections may be used to connect the central terminal 38 with the substations 18A and 18B such as radio or microwave links.

The central terminal 38 generates an interrogation information signal having but not limited to a binary logic encoded word format which is the same as disclosed in the above identified U.S. Pat. No. 3,820,073. The format includes a coded address corresponding to a customer identification code assigned to each customer location. The interrogation word format also includes a command signal portion for requesting meter reading readout, a control function to be performed or other monitoring data to be received by the station 10. The terminal 38 is also adapted to receive and decode remote meter reading signals or other appropriate response information signals having the same binary logic encoded word format transmitted from the customer locations as described hereinbelow. It is contemplated that logic encoded word format may include three binary bit positions, for example, for control of the operation of the repeaters as noted further hereinbelow.

The distribution network power line carrier communication system 32 is controlled by the substation terminals to relay interrogation and response signals between the central station 10 and the customer locations. The other major parts of the system 32 include frequency translating and signal reconditioning repeaters indicated by the numerals 46, 47 and 48. The other major parts of the system 32 include the remote customer response communication terminal provided at each of the customer locations as indicated by numeral 50 in block 14A. Each of the substation terminals 42A and 42B; the repeaters 46, 47 and 48; and each of the remote terminals 50 include substantially identical transmitter and receiver circuits described more fully hereinbelow in connection with the description of FIGS. 2, 3A, 3B and 3C.

The remote response terminal 50 includes a logic circuit 51 suitable for translating and decoding the received interrogation logic information signals from the station 10 to affect control of the control circuit 41 and to sample and encode the reading of the meter 40 and to generate an encoded response logic signal output. For encoding meter readings the logic circuit 51 includes a solid state circuit arrangement with nonvolatile counting as described in the aforementioned U.S. Pat. No. 3,820,073.

Each of the transmitters and receivers of the substation terminals 42A and 42B of the repeaters 46, 47 and 48 and the remote terminal 50 are coupled to the distribution power line by a single power line coupler at each site and they are designated 53A, 53B, 53C, 53D, 53E, 53F and 53G in FIG. 1. The couplers in one embodiment are intended to block the normal 60 hertz power frequency of the power network 16 from the transmitter and receiver circuits and transmit the carrier signals to the terminals and repeaters.

The substation terminals 42A and 42B are connected to the data sets 45A and 45B and include a transmitter T1 and a receiver R2 in terminal 42A and a transmitter T7 and receiver R8 in the terminal 42B. The transmitters T1 and T7 form interrogation carrier signal transmitters and the receivers R2 and R8 form response carrier signal receivers in which the transmitter output and the receiver inputs are connected to common points of the power line conductor 24B at each substation by couplers 53A and 53G. The transmitters T1 includes modulation circuitry, as described in detail hereinbelow, and has an output interrogation carrier signal F1 having one frequency band modulated by the interrogation binary logic information signal received from the central station terminal 38. The input to the response receiver R2 receives a response carrier signal F2 having a frequency band different from that of the band of the carrier signal F1 and is modulated by a response binary logic information signal generated at a customer remote terminal. The carrier signals are all frequency shift key modulated in which two frequencies represent the two binary one and zero states of the logic information signals. The signal F1 shown in FIG. 1 has a reference carrier frequency F1A in the order of about 25 to about 400 kilohertz representing the zero binary state and a frequency F1B having a small fractional bandwidth deviation from F1A, for example 2 to 10 kilohertz higher.

The remote response terminal 50 of customer 14A includes an interrogation receiver R1 and a response transmitter T2 connected to the same coupler 53B connected to the conductor 36A'. Due to the close proximity of the customer 14A to the substation 18A the interrogation receiver R1 receives the interrogation carrier signal F1 generated by the substation terminal transmitter T1. Similarly, transmitter T2 sends carrier signal F2 to the receiver R2.

At a point F of the conductor 24B the carrier signal F1 becomes degraded so that the repeater 46 is coupled thereby by the coupler 53C. Each of the repeaters such as 46 includes interrogation and response channels. The interrogation channel of repeater 46 includes the receiver R1 as included at customer 14A and transmitter T3 and a response channel including the receiver R4 and a transmitter T2 as included at substation 18A. The input of the receivers R1 and R4 and the outputs of the transmitters T2 and T3 are connected to the common point F by the coupler 53C. The receiver R1 receives the carrier signal F1 and the transmitter T2 transmits the carrier signal F2 to provide the communication link between the repeater 46 and the substation terminal 42A. The repeater is a frequency translating type so that the output of the transmitter T3 is an interrogation carrier signal F3 having a frequency band different from either F1 or F2 and, accordingly, the receiver R4 is adapted to receive a response carrier signal F4 that has a further different band which does not overlap the band of the frequencies of the signals F1, F2 or F3. Accordingly, the repeater 46 forms a communication zone, designated Z2 between the points P1 and P2 on the conductor 24B where P1 is substantially midway between substation 18A and repeater 46 and point P2 is substantially midway between the repeaters 46 and 47. A first communication zone is formed between the substation 18A and the point P1. Accordingly, a large number of customers including customers 14D and 14E communicate exclusively through the repeater 46 since the interrogation receivers thereof are all responsive to the interrogation carrier signal F3 and the response transmitters thereof are all arranged to transmit the response carrier signal F4. The logic information signals of the carrier signals F3 and F4 will, of course, be coded with separate address and identification codes so that only the receivers of the associated customer are operated within the zone Z2 although having the same carrier frequencies.

The customer 14F is also shown within the zone Z2 however, another application of a repeater made in accordance with this invention is shown including repeater 48 which is used for bypassing the distribution transformer 34D. In this case couplers 53D and 53E are connected to the primary conductor 24B and secondary conductor 36D at points G and H at the transformer 34D. The interrogation channel of the repeater 48 includes a receiver R3 adapted to receive the carrier signal F3 and further includes a transmitter T5 adapted to transmit an interrogation carrier signal F5. The response transmitter T4 transmits the carrier signal F4 and has an input from the receiver R6 which receives a response carrier signal F6 from the remote customer 14F. The frequency bands of the carrier signals F5 and F6 are different and do not overlap each other or the frequency bands of the carrier signals F3 and F4. The use of repeater 48 prevents obstruction to the carrier signals by transformer 34D and relays the carrier signals in the case that customer 14F is at a distant isolated location.

A third communication zone Z3 is established by the coupling of the repeater 47 to the point I of the conductor 24B. The repeater 47 includes an interrogation channel having a receiver R3 and transmitter T8 and a response channel including the receiver R7 and transmitter T4. The receiver R3 and transmitter T4 are the same as previously described to interrogation carrier signals F8 and response signals F7, respectively, having different frequencies from each other and from either of the signals F3 and F4. This permits communication between the repeater 47 and the repeater 46 by the carrier signals F3 and F4 and communication between the repeater 47 and the customer 14G within the zone Z3, extending between point P2 of conductor 24B and point P3 at the substation 18B, by the interrogation and response carrier signals F8 and F7 in accordance with the description above.

In the case where the second substation 18B may be either alternately connected by means of the line switch 28 of concurrently connected to the distribution network 16 along with the substation 18A, the substation terminal 42B will have a response receiver R7 and an interrogation transmitter T8 operative to receive and transmit the carrier signals F7 and F8. It is seen that even if both substations are connected to the distribution network 16, carrier signals of the substation terminals 42A and 42B are isolated because they operate with different carrier signal frequencies. This is also true of the remote customer terminals within a given zone since they interrogation and response carrier signals will not be in direct interfering communication relationship with the remote customer terminals within another communication zone. The communication system 32 is capable of many combinations of connections utilizing the repeaters of this invention and establishing the customer locations in communication zones. It is contemplated that the single substation terminal 42A would be used to communicate with the customer locations of the distribution network 16. The other substation terminal 42B is only in communication with the customer location 14G unless an optional and additional repeater 47A is used. This additional repeater 47A would be coupled to the point I by the coupler 53F to communicate with the remaining customer locations besides location 14G. One channel of the repeater 47A includes the receiver R2 and transmitter T7 for receiving the carrier signal F2 and transmitting the carrier signal F7 and another channel includes the receiver R8 and transmitter T1 for receiving and transmitting carrier signals F8 and F1. This establishes the proper carrier signal frequencies for communication with the repeater 46 and the remaining customer locations in zones Z1 and Z2. Further flexibility is contemplated by switching either of the two receivers of a repeater to either of the two transmitters as described in connection with the description of FIG. 2A.

Figures 2, 2A:
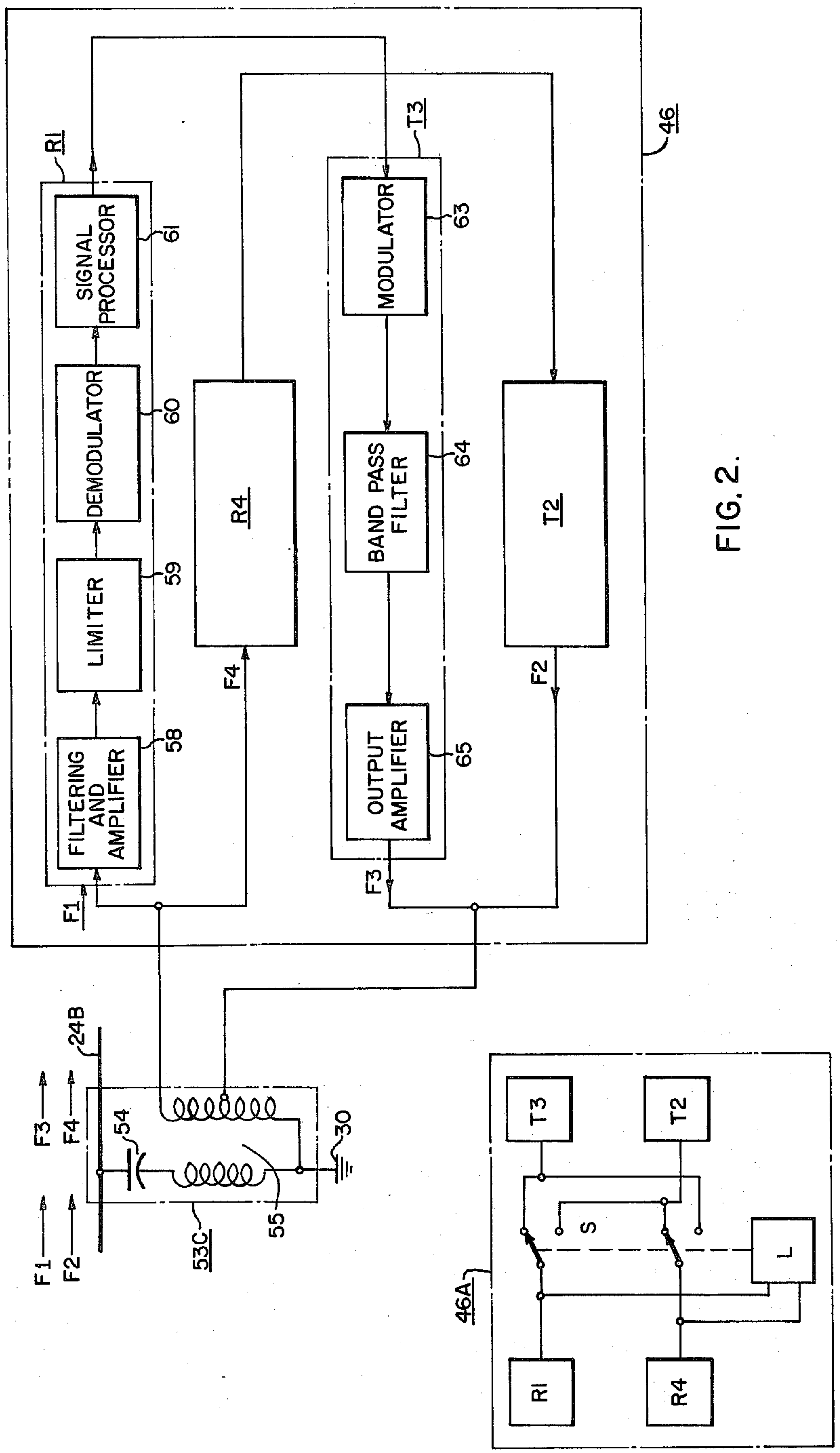
FIG. 2 is a block schematic diagram of a frequency translating and signal reconditioning repeater included in the communication system illustrated in FIG. 1.
FIG. 2A is a block schematic diagram of an alternative embodiment of the repeater illustrated in FIG. 2.

Referring now to FIG. 2 there is shown a typical block diagram circuit arrangement for the repeater 46 as well as all the other repeaters which are the same except for the carrier frequencies. The couplers, such as 53C include filter circuit elements provided by a capacitor 54 having a transformer 55 which is typically a matching transformer having a predetermined turn ratio which is dependent upon the impedance of the distribution power line conductor 24B and the impedances of the receiver and transmitter circuits of the repeater. The coupler 53C forms a high pass filtering circuit for eliminating the 60 hertz power line frequency from the transmitters and receivers. The coupler 53C is connected between the conductor 24B and the system common ground 30, which as noted hereinabove, is either a common ground source of the distribution network 16 or a grounded neutral conductor connected to the transformer bank 22A. The interrogation channel of the repeater 46 includes the receiver R1 and transmitter T3 in which the receiver R1 has an input provided by a filtering and amplifier circuit 58. The output of the circuit 58 is applied to a limiter 59 to remove excess noise from the carrier signal F1 and provides amplification of the typically low level input. The output of the limiter circuit 59 is applied to a demodulator circuit 60 which produces the demodulated baseband binary interrogation logic signal initiated from the central station terminal 38 and relayed by the substation terminal 42A. A signal processor circuit 61 includes either a Schmitt trigger type circuit or, preferably, a binary logic switching circuit which reshapes and reconstitutes the received interrogation logic information signal.

The output of the receiver R1 is applied to the input of the transmitter T3. The receiver circuit R1 is identical to the other receivers of the repeater circuit including the receiver R4 of the same repeater 46 and the receiver circuits used at the substation terminals and each of the receivers at the remote customer locations. The input to the transmitter T3 includes a modulator 63 which includes an oscillator-modulation combination that develops the carrier signal F3 frequencies so as to frequency translate between the repeater input and output. The output of the modulator 63 is applied to a bandpass filter 64 and the filtered output of filter 64 is applied to an output amplifier 65 and the transmitter output is applied back to the transformer 55 of the coupler 53C so that the transmitted interrogation carrier signal F3 is injected back on the power line 24B at the same point that the interrogation carrier signal F1, carrying the same interrogation information signal, is received.

It is to be kept in mind that the transmitting and receiving circuits provided at the repeaters such as 46 and at the substation terminals may be substantially more powerful and sensitive than are the transmitter and receiver circuits provided at the customer location even though they are made of substantially the same circuit configuration and design. This is permitted since the repeaters may be placed, for example at locations separated by a few miles whereas the customer locations may be within a few hundred feet or yards from a repeater. As the distance of the customer locations increases from a repeater the customer transmitters may be made more powerful but still do not require to be as powerful as the circuits used in the repeaters to reduce costs.

It is also to be kept in mind that equivalent demodulating receiving circuits and equivalent modulating transmitting circuits may be substituted for those described in detail below to perform the same signal reconditioning and frequency translating operations in accordance with the present invention. For example, the filtering and amplifier circuit 58 in the receiver R1 may be replaced by a tuned amplifier tuned to the carrier signal F1. It is contemplated in a preferred embodiment to use a slope detector, described in detail hereinbelow, for the circuit 60, however, other known frequency detectors and demodulator circuits can be utilized. The transmitter modulator 63 is modulated by the base band logic information signal output of the receiver R1 which modulates the frequency of a Colpitts type oscillator in one preferred embodiment of the circuit 63. It is contemplated that other known frequency modulator and mixing circuits may be used, for example, utilizing a heterodyning effect in a mixer circuit which has an input oscillator operated at a base frequency of the transmitter output carrier signal.

In FIG. 2A, is shown an alternate embodiment of a repeater 46A illustrated as replacing the repeater 46 in one exemplary use. The receivers R1 and R4 and transmitters T2 and T3 include the same circuits as in the repeater 46. A switch arrangement S is shown arranged to apply each of the outputs of the receivers R1 and R4 alternatively to either of the transmitters T3 or T2 under control of a logic circuit L. The logic circuit L is responsive to control bit positions in the base band information signal which is encoded to command the desired receiver-transmitter combination. The repeater of this invention permits this since the receiver outputs are the base band binary logic information signal form. Accordingly, the received carrier signal F1 can be transmitted at either of the frequencies of the carrier signals F3 or F2. Similarly, carrier signal F4 can be retransmitted as either of the carrier signals F3 or F2. This aids in the flexibility of establishing the communication zone frequencies and selecting the carrier signal frequencies for desired communication interconnections between the customer locations, selected repeaters, and substation terminals as shown in FIG. 1.

Figure 3A:
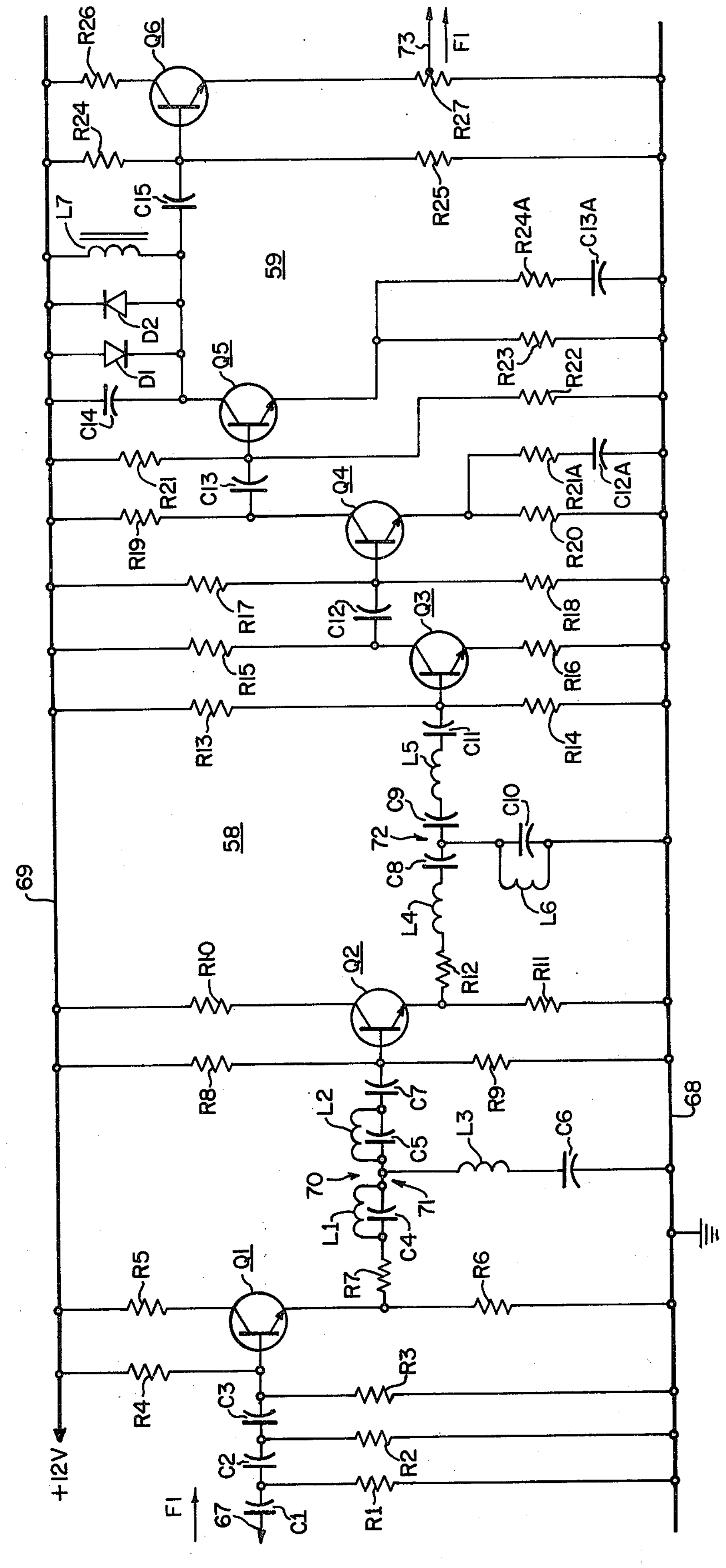
FIGS. 3A, 3B, and 3C are detailed electrical schematic diagrams of the repeater illustrated in FIG. 2.
Figure 3B:
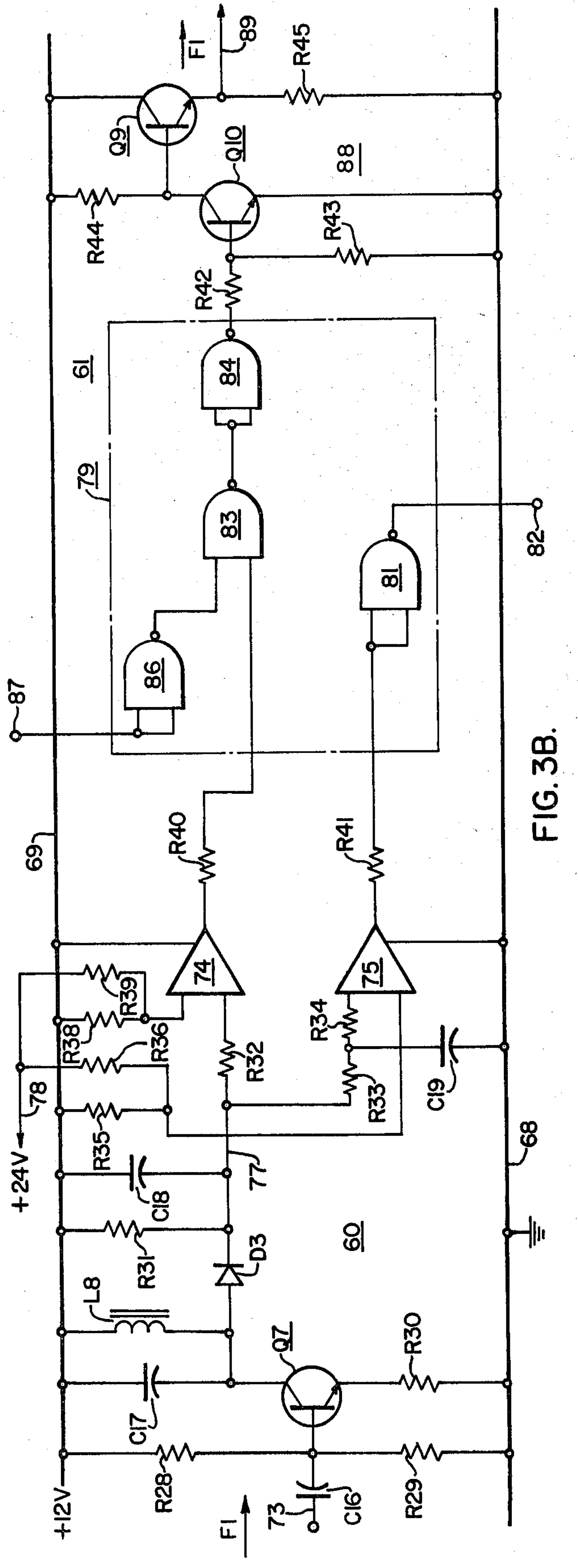
Figure 3C:
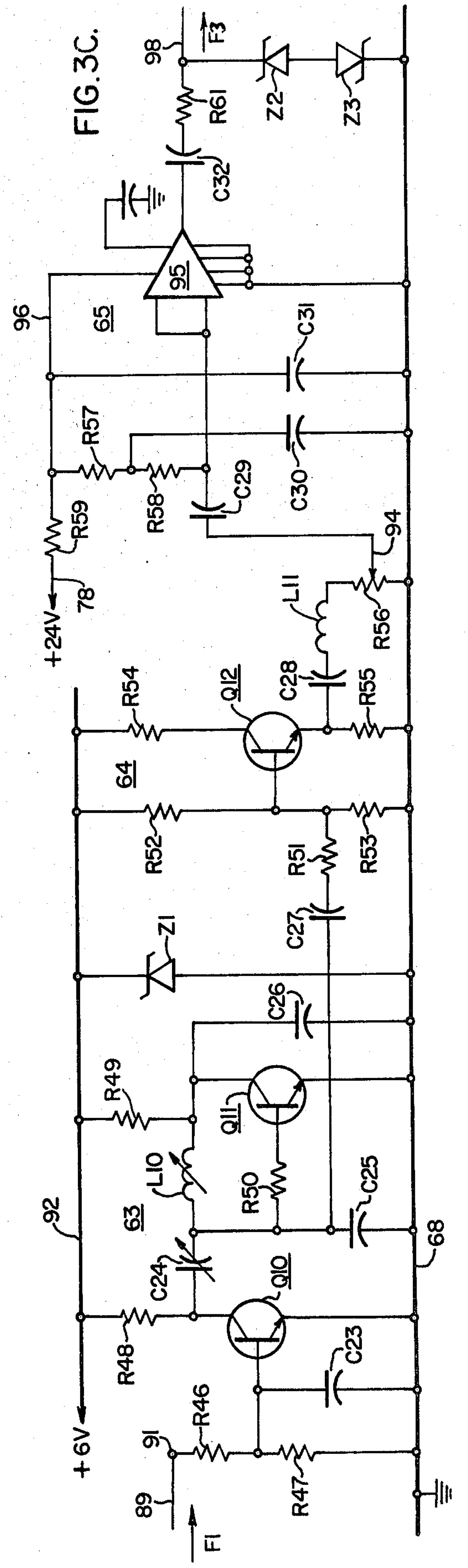

Referring now to the FIGS. 3A, 3B and 3C which show in detail the circuit arrangements of the portion of the block schematic diagram of FIG. 2 illustrating the interrogation repeater channel including the receiver R1 and the transmitter T3 in repeater 46. The FIGS. 3A and 3B show the receiver circuit details as utilized in each of the two repeater channels and FIG. 3C illustrates the transmitter circuits which is utilized in each of the repeater channels.

In FIG. 3A there is shown the filtering and amplifier circuit 58 having an input section including signal input 67 connected to the series connected coupling capacitors C1, C2 and C3 with resistors R1, R2 and R3 connected between the capacitors and a circuit common ground conductor 68. The carrier input signal F1 is applied between input 67 and conductor 68 which is coupled to the base and emitter of the transistor Q1 having bias resistors R4 and R5 connected between the base and collector electrodes and a voltage supply conductor 69 connected to a suitable voltage source, for example one of positive 12 volts. All transistors illustrated in FIGS. 3A, 3B, and 3C are in NPN type 2N2222. A resistor R6 is connected in series with the emitter electrode to provide the transistor amplifier output as an emitter follower circuit configuration. The output of transistor Q1 is applied through a resistor R7 to a T-section band-stop or rejection filter 70 including parallel connected inductor L1 and capacitor C4 and parallel connected inductor L2 and capacitor C5. The junction 71 between the parallel tuned elements includes a series inductor L3 and capacitor C6 connected to the ground conductor 68. The filter 70 is intended to block the frequencies of the transmitter carrier signal output of the transmitter in the same repeater channel or of the other channel having a frequency band closest to the receiver input signal band. The output of the filter 70 is coupled through a capacitor C7 to the input of an amplifying transistor Q2. Resistors R8 and R9 provide the base biasing resistances and a resistor R10 connects the collector to the supply conductor 69. A resistor R11 is connected in series with the emitter and ground conductor 68 to provide the translator output to a resistor R12 connected to the emitter electrode.

The output of the transistor Q2 is connected to a bandpass filter 72 also having a T-section configuration. This filter is to exclusively pass the frequencies of the input carrier signal F1 of the receiver R1. Two identical series connected inductor and capacitor combinations including inductor L4, capacitor C9 and inductor L5, capacitor C9 having a junction between the combinations connected with parallel connected capacitor C10 and inductor L6 which is in turn connected to the ground conductor 68.

The output of the bandpass filter 72 is coupled through a capacitor C11 to the base of a transistor Q3 having a similar configuration as transistor Q2 including biasing resistor R13 connected to the supply conductor 69 and the base and a resistor R14 connected between the base and the ground conductor 68. A resistor R15 is connected between the supply conductor 69 and the collector. An emitter connected resistor R16 is further connected to the conductor 68. The output of the transistor Q3 is developed at the collector as applied to the capacitor C11 to the input of an amplifier transistor Q4 forming the amplifier output of the receiver section 58. The biasing resistors R17 and R18 are connected between the base and the conductors 69 and 68, respectively. A resistor R19 is connected between the conductor 69 and the collector with an emitter connected resistor R20 connected further to the conductor 68. The resistor 20 is bypassed by a resistor R21A connected in series with bypass capacitor C12A connected between the emitter and conductor 68.

The amplified output of the transistor Q4 is applied from the collector electrode to the input of the limiter 59. The limiter 59 is of the diode limiter type having the input supplied to a coupling capacitor C13 having an input translator Q5 having biasing resistors R21 connected between the base and the conductor 69 and resistor R22 connected between the base and the conductor 68. The emitter electrode includes a resistor R23 which is bypassed by a resistor R24A and capacitor C13A connected in series between the emitter electrode and conductor 68. The limiting diodes D1 and D2 are connected in parallel opposing relationship between the conductor 69 and the collector of the transistor Q5. A capacitor C14 and inductor L7 form the tuning elements of the limiter circuit and are connected in parallel across the diodes D1 and D2.

The output of the limiting circuit arrangement of limiter 59 is coupled through a capacitor C15 to the input of an amplifying translator Q6 having base biasing resistors R24 and R25 connected between the base and conductors 69 and 68, respectively. A collector resistor R26 is connected to the supply conductor 69 and a resistor R27 is connected between the emitter and conductor 68 and develops the limiter output thereacross at the resistor tap conductor 73.

Referring now to FIG. 3B there is shown the remaining portion of the receiver R1 circuit in which the output conductor 73 of the limiter 59 is applied to the demodulator section 60 through a capacitor C16 to a slope detector circuit including a transistor Q7 having biasing resistors R28 and R29 connected between the base and supply and ground conductors 69 and 68, respectively. The base is connected to the capacitor C16 supplying the output signal from the limiter 59. The emitter of the transistor Q7 includes a resistor R30 connected to the conductor 68. The collector has connected thereto a tuning capacitor C17 connected between the collector and the supply conductor 69 and in parallel with a tuning inductor L8. A detecting diode D3 is connected in series with the transistor collector with the polarity shown having the anode connected to the collector and the cathode connected to one end of a resistor R31 which has the other end connected to the conductor 69. A capacitor C18 is also connected between the diode cathode and the conductor 69. The detected logic information signal is developed at conductor 77 connected to the cathode of the diode D3 and still has some extraneous noise included thereon. Accordingly, the output of the demodulator 60 is applied to the signal processor circuit 61 for reconditioning to reconstitute the original logic information signal.

The signal processor circuit 61 has two input voltage comparator amplifiers 74 and 75 which are of an integrated circuit type SN 72747N. The detected signal of the demodulator 60 is applied from the conductor 77 and through a resistor R32 to one input of the comparator 74 and through series resistors R33 and R34 connected to one input of the comparator 75, with a capacitor C19 connected between the junction of R33 and R34 and conductor 69. Reference voltages are applied at the other of two inputs of each of the comparator amplifiers 74 and 75 by a resistor R35 connected to the supply conductor 69 and a resistor R36 connected to a supply conductor 78 connected to a source of 24 volts. Common ends of the resistors R35 and R36 are connected together and to the second input to the amplifier 75. Reference voltage is also provided by resistors R38 and R39 having common ends connected together and to the second input to the amplifier 74, with the remaining end of the resistor R38 connected to the supply conductor 69 and with the other end of the resistor R39 connected to the conductor 78. The output of the comparator amplifier 75 is responsive to the reference level of the detected signal on conductor 77 to detect the presence of the received carrier signal. The output of the comparator amplifier 74 is responsive to the two voltage levels of the detected logic signals and is applied to a resistor R40 and to a pulse shaping logic circuit 79 which is a RCA circuit type CD 4011AE. A square wave output of the comparator amplifier 74 is responsive to the information logic signal to trigger the circuit 79. The output from the comparator amplifier 75 is applied through a resistor R41 to the logic circuit 79 at a NAND gate 81 having the two inputs connected together to form an inverter circuit having a circuit test output 82 which provides an indication that the carrier signal is being received at a suitable level at the receiver input 67.

The pulse shaping portion of the circuit 79 includes two NAND gate circuits 83 and 84 in which one input of gate 83 receives the output of the comparator amplifier 74. The second input to the NAND gate 83 is supplied from a NAND gate 86. A receiver muting function is provided by gate 86 in response to a signal applied at the terminal 87 which is connected to the common connected inputs of the gate 86. An output of gate 86 provides an inhibiting input to the other input of the NAND gate 83 when a signal is applied to the muting terminal 87. This prevents an output from the gate 83. The gate 83 is triggered when not inhibited at a predetermined threshold value of the output signal from the comparator amplifier 74 and the output of the gate 83 is applied to the commonly connected inputs of the gate 84 which provides a signal inverting function to develop the reconditioned and reconstituted logic information signal carried by the carrier signal F1 applied to the input of the receiver R1.

The output of the signal processor circuit 61 is provided at an amplifier circuit 88 suitable for amplifying the output of the logic circuit 79. The amplifier 88 includes transistors Q8 and Q9 with the output of the circuit 79 being applied through the resistor R42 connected to the base of the transistor Q8 and a bias resistor R43 is connected between the base and the ground conductor 68. The collector of the transistor Q8 is connected through a resistor R44 to the supply conductor 69. The collector output of transistor Q8 is coupled directly to the base input of the transistor Q9 which has the collector directly connected to the supply conductor 69 and forms an emitter follower circuit having an emitter connected resistor R45 connected at its other end to the ground conductor 68. The originally transmitted base band binary logic information signal is then developed across the resistor R45 between output conductor 89 and the ground conductor 69.

The transmitter T3 circuit connected to the receiver R1 is shown in FIG. 3C. The receiver R1 output conductor 89 is applied at the transmitter input 91 and across series resistors R46 and R47. The junction of these resistors is connected to the base of a transistor Q10 provided at the input of the modulator circuit 63. A capacitor C23 is connected between the base and the ground conductor 68. The collector of transistor Q10 is connected through a resistor R48 to a voltage supply conductor 92 connected to a voltage source of positive six volts. A voltage regulating Zener diode Z1 is connected between conductor 92 and the ground conductor 68. A Colpitts oscillator circuit, having a frequency equal to the reference carrier frequency of the transmitter is also connected at the collector of transistor Q10 through a capacitor C24. The capacitor C24 is connected through the frequency determining inductor L10 which is connected through a resistor R49 to the conductor 92 and to the collector of an oscillator transistor Q11. A resistor R50 couples the junction of the capacitor C24 and inductor L10 to the base of the transistor Q11. The junction of capacitor C24 and inductor L10 is further connected to a capacitor C25 connected in series to the ground conductor 68. The emitter of the transistor Q11 is directly connected to the conductor 68. A capacitor C26 is connected across the collector and emitter electrodes. In operation, the transistor Q10 of the modulator 63 is biased conductive and non-conductive by the logic information signal binary states to modulate the reference carrier frequency established by the oscillator including the transistor Q11. This produces frequency deviations defining the FSK modulated carrier signal F3 frequency band.

The modulator 63 has its output applied to the bandpass filter 64 through series coupling elements including a capacitor C27 and resistor R51. The filter 64 includes an input transistor Q12 having biasing resistors R52 and R53 connected between the conductor 69 and conductor 68 with the junction therebetween connected to the resistor R51 and the base. The collector is connected via a resistor R54 to conductor 92, and the emitter is connected to a resistor R55 which in turn is connected to the conductor 68. The output of transistor Q12 is developed across a resistor R55 for input to the bandpass filtering elements including a capacitor C28 connected in series with the inductor L11 which in turn is connected in series with a resistor R56 connected at the other end to the conductor 68. The output of the bandpass filtering elements is provided at a tap 94 of the resistor R56. The output of the bandpass filter 64 includes the modulated transmitter carrier signal F3 before it is applied to the output amplifier 65 of the transmitter T3.

The input to the amplifier 65 from the tap connection 94 of the resistor R56 is applied through a capacitor C29 to the input of an amplifier 95 being an integrated circuit which may be a Motorola type MC 1316. The inputs of the amplifier 95 are connected together and to the capacitor C29. Biasing resistors R57 and R58 are connected in series between a supply conductor 96 and the common inputs of the amplifier 95. The conductor 96 is connected through resistor R59 to a source of positive 24 volts. The junction of the resistors R57 and R58 is connected through a capacitor C30 to the ground conductor 68. A capacitor C31 is connected across the conductor 96 and ground conductor 68. The output of the amplifier circuit 95 develops the transmitter modulated interrogation carrier signal F3 having a frequency band different from that originally applied to the input of the receiver R1, as explained hereinabove. This output is applied through a capacitor C32 and resistor R61. The transmitter output carrier signal F3 is then developed at conductor 98 connected to the junction of the resistor R61 and the series connected reversely poled Zener diodes Z2 and Z3 connected between the resistor R61 and a ground conductor 68. The transmitter output conductor 98 is then connected back to the same coupler 53C which also received the receiver input signal F1, as noted hereinabove. The transmitter amplifier 65 is capable of generating a power output in the order of about 0.5 to about 3 watts.

Having described the detail arrangements of the receiver R1 and transmitter T3 it is to be kept in mind that the transmitter circuit T3 is utilized at the different transmitter circuit locations indicated in FIG. 1, and, accordingly, the receiver circuit as described above replaces any of the receiver circuits indicated in the system shown in FIG. 1.

To briefly summarize the operation of the system shown in FIG. 1 including the transmitter and receiver circuits as described in detail for the repeater 46, the central station 10 initiates from the terminal 38 an interrogation information signal which is transmitted over the conventional communication connection including a telephone line 43A to substation terminal 42A. The interrogation information signal is modulated on the carrier signal F1 and is amplified and coupled through the coupler 53 A to the distribution power line conductor 24B. The interrogation carrier signal is transmitted for reception by any of the customer locations such as being directly received at location 14A in zone Z1. The carrier signal is also transmitted to subsequent zones by retransmission through the frequency translating and signal reconditioning repeaters which retransmit the same interrogation information signal on different carrier signals to adjacent zones at different carrier frequencies.

The customer terminals have receivers such as R1 at location 14A which receive and demodulate the input carrier signal and are responsive to the particular address code contained in the interrogation information signal originated at the central station. The required meter reading or control function is commanded to the customer logic circuit 51 which in turn initiates a response information signal output to the customer response transmitter such as T2. The response signal initiated by the customer transmitter includes the customer meter readings, for example, and information having an identification logic signal portion of the response signal and is transmitted directly back to the substation receiver R2 of when the customer is in a different communication zone it is retransmitted back through the repeaters to the substation 18A.

The repeaters made in accordance with this invention are particularly advantageous to power line carrier signal application whereas the conventionally used types of repeaters typically employed in communication system lines are negative impedance amplifiers. These types of repeaters are not practical for power line carrier applications due to the various adverse loading characteristics to high frequency signals on power lines. The advantages of the flexibility of arranging the repeaters to transmit between adjacent receivers or with the substation terminals or with remote customer terminals divided into communication zones of various combinations is enabled by signal reconditioning and frequency translating operations of the repeater described hereinabove.

It is contemplated that various modifications and changes can be made to the distribution power line network communication system as described hereinabove without departing from the spirit and scope of this invention.

I claim as my invention:

1. A power line communication system for transmitting communication signals over distribution network power line conductors connected between a distribution network substation and a plurality of electric power customers, comprising:

a first communication terminal including transmitter means and receiver means arranged for coupling to said power line conductors at said substation, said transmitter means being operative to transmit a first interrogation signal in a first frequency band modulated by binary logic information signals, repeater means including first and second channels, said first channel including first receiver means and first transmitter means, said second channel including second receiver means and second transmitter means, said first and second receiver means and said first and second transmitter means being arranged for coupling to said power line conductors, and a second communication terminal including transmitter means and receiver means arranged for coupling to said power line conductors at one of said plurality of electric power customers, said second communication terminal including decoding and encoding logic circuit means connected to said transmitter means and said receiver means, said first channel of the repeater means providing a second interrogation signal in response to said first interrogation signal which has the same binary logic information as the first interrogation signal but which is in a second frequency band, non-overlapping with said first frequency band, said receiver means of the second communication terminal, in response to a second interrogation signal, including means reconstructing the binary logic information signals of the second interrogation signal, and means applying the binary logic information signals to said decoding and encoding logic circuit means, said transmitter means of the second communication terminal including means operative to modulate binary logic information signals applied thereto from said decoding and encoding logic circuit means, and being further operative to provide a first response signal in a third frequency band which is non-lapping with the frequency band of the second interrogation signal, said second channel of the repeater means providing a second response signal in response to said first response signal which has the same binary logic information as the first response signal but which is in a fourth frequency band, non-overlapping with the third frequency band, said receiver means of the first communication terminal being operative to receive said second response signal.

2. The power line communication system of claim 1 wherein the first and second interrogation signals and the first and second response signals received and transmitted from the repeater means include frequency shift keyed modulated carrier signals having base band binary logic information signals, and wherein each of the first and second receiver means of the repeater means include slope detector means having a detecting element developing a detected signal variable between two voltage levels, and comparator amplifier means responsive to the two voltage levels of said detected signal for developing for two level logic signals corresponding to a reconditioned form of the base band binary logic information signals of the received carrier signal.

3. A distribution network power line carrier communication system for transmitting communication signals over power line conductors connected between a distribution network substation and a plurality of electric power customers, comprising:

first terminal means at the substation providing a first interrogation signal in a first frequency band, means for applying said first interrogation signal to the power line conductors, first repeater means remote from the substation including first receiver means for receiving said first interrogation signal from the power line conductors, said first repeater means including first transmitter means providing a second interrogation signal responsive to said first interrogation signal in a second frequency band which is non-overlapping with the first frequency band of said first interrogation signal, and means applying said second interrogation signal to the power line conductors.

4. The distribution network power line carrier communication system of claim 3 including:

second terminal means, said second terminal means including means for receiving the second interrogation signal, and means responding to at least certain of the second interrogation signals by providing a first response signal in a third frequency band which is non-overlapping with the second frequency band, means for applying said first response signal to the power line conductors, and means for receiving said first response signal from the power line conductors.

5. The distribution network power line carrier communication system of claim 4 wherein the means for receiving the first response signal includes second receiver means of the repeater means, and wherein the repeater means includes second transmitter means responsive to the first response signal providing a second response signal in a fourth frequency band which is non-overlapping with the third frequency band, means applying the second response signal to the power line conductors, and means for receiving said second response signal from the power line conductors.

6. The distribution network power line carrier communication system of claim 3 including distribution transformer means, and wherein the power line conductors include first power line conductors which extend from the substation to said distribution transformer means, and second power line conductors which extend from said distribution transformer means to certain of the electric power customers, the repeater means is located at said distribution transformer means, the first receiver means receives the first interrogation signal from the first power line conductors, and the first transmitter means applies the second interrogation signal to the second power line conductors.

7. The distribution network power line carrier communication system of claim 6 including second terminal means for receiving the second interrogation signal from the second power line conductors and for applying a first response signal in a third frequency band, non-overlapping with the second frequency band, to the second power line conductors, and the repeater means includes second receiver means for receiving the first response signal from the second power line conductors, and second transmitter means providing a second response signal responsive to the first response signal in a fourth frequency band, non-overlapping with the third frequency band, and means applying the second response signal to the first power line conductors.

8. The distribution network power line carrier communication system of claim 3 including means providing a first binary base band signal, with the first terminal means including modulator means which provides the first interrogation signal in response to said first binary base band signal.

9. The distribution network power line carrier communication system of claim 8 wherein the first receiver means includes means responsive to the first interrogation signal for reconstituting the first binary base band signal, and the first transmitter means includes modulator means responsive to the reconstituted binary base band signal for providing the second interrogation signal.

10. The distribution network power line carrier communication system of claim 9 wherein the first receiver means includes means for improving the waveform of the reconstituted first binary base band signal.

11. A distribution network power line carrier communication system for transmitting signals over power line conductors connected between a distribution network substation and a plurality of electric power customers, comprising:

means providing interrogation and response signals on the power line conductors in different, non-overlapping frequency bands, and repeater means coupled to the power line conductors including first receiver means for receiving an interrogation signal in a first of the frequency bands, and first transmitter means responsive to the interrogation signal received by said first receiver means for providing an interrogation signal on the power line conductors in a second of the frequency bands.

12. The distribution network power line communication system of claim 11 wherein the repeater means includes second receiver means for receiving a response signal in a third of the frequency bands, and second transmitter means responsive to the response signal received by said second receiver means for providing a response signal on the power line conductors in a fourth of the frequency bands.

13. The distribution network power line communication system of claim 12 wherein the repeater means includes switch means for selectively connecting each of the first and second receiver means to either of the first and second transmitter means.

14. A distribution network power line carrier communication system for transmitting communication signals over power line conductors connected between distribution network substations and a plurality of electric power customers, comprising:

first terminal means at a first substation in signal communication with the power line conductors of the first substation, said first terminal means including first transmitter means and said receiver means, said first transmitter means providing interrogation signals in a first frequency band, and second terminal means in signal communication with the power line conductors of the first substation at one of the electric power customers, said second terminal means including second receiver means and second transmitter means, said second receiver means being responsive to at least certain of said interrogation signals, said second transmitter means providing a response signal in a second frequency band, non-overlapping with said first frequency band, in response to said second receiver means, said first receiver means being responsive to response signals in said second frequency band.

15. The distribution network power line carrier communication system of claim 14 including:

repeater means in signal communication with the power line conductors, and third terminal means in signal communication with the power line conductors, at another of the electric power customers, said repeater means including third receiver means responsive to interrogation signals in the first frequency band, and third transmitter means providing interrogation signals in a third frequency band, non-overlapping with the first and second frequency bands, in response to said third receiver means, said third terminal means including fourth receiver means responsive to at least certain of the interrogation signals in said third frequency band.

16. The distribution network power line carrier communication system of claim 15 wherein the third terminal means includes fourth transmitter means providing response signals in a fourth frequency band in response to the third receiver means, and wherein the repeater means includes fifth receiver means and fifth transmitter means, said fifth receiver means being responsive to response signals in said fourth frequency band, said fifth transmitter means providing response signals in the second frequency band in response to said fifth receiver means.

17. The distribution network power line carrier communication system of claim 14 including:

third terminal means at a second substation in signal communication with the power line conductors of the second substation, said third terminal means including third transmitter means and third receiver means, said third transmitter means providing interrogation signals in a third frequency band, non-overlapping with the first and second frequency bands, fourth terminal means in signal communication with the power line conductors of the second substation at one of the electric power customers, said fourth terminal means including fourth receiver means and fourth transmitter means, said fourth receiver means being responsive to at least certain of the interrogation signals in the third frequency band, said fourth transmitter means providing a response signal in a fourth frequency band, non-overlapping with the first, second and third frequency bands, in response to said fourth receiver means, said third receiver means being responsive to response signals in said fourth frequency band, switch means interconnecting the power line conductors of the first and second substations, and first and second repeater means in signal communication with the interconnected power line conductors of the first and second substations, said first repeater means including a first channel having fifth receiver means and fifth transmitter means, and a second channel having sixth receiver means and sixth transmitter means, said second repeater means including a first channel having seventh receiver means and seventh transmitter means, and a second channel having eighth receiver means and eighth transmitter means, the first channels of said first and second repeater means relaying interrogation signals from the first terminal means to the fourth terminal means, with said fifth receiver means being responsive to interrogation signals in the first frequency band, the fifth transmitter means providing interrogation signals in a fifth frequency band in response to said fifth receiver means, said seventh receiver means being responsive to interrogation signals in the fifth frequency band, and said seventh transmitter means providing interrogation signals in the third frequency band, the second channels of said first and second repeater means relaying response signals from the fourth terminal means to the first terminal means, with the eighth receiver means being responsive to response signals in the fourth frequency band, the eighth transmitter means providing response signals in a sixth frequency band, in response to said eighth receiver means, the sixth receiver means being responsive to response signals in the sixth frequency band, and the sixth transmitter means providing response signals in the second frequency band, in response to said sixth receiver means.

* * * * *